US006996517B1

(12) United States Patent
Papaefstathiou

(10) Patent No.: US 6,996,517 B1
(45) Date of Patent: Feb. 7, 2006

(54) PERFORMANCE TECHNOLOGY INFRASTRUCTURE FOR MODELING THE PERFORMANCE OF COMPUTER SYSTEMS

(75) Inventor: Efstathios Papaefstathiou, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1117 days.

(21) Appl. No.: 09/632,521

(22) Filed: Aug. 4, 2000

Related U.S. Application Data

(60) Provisional application No. 60/209,759, filed on Jun. 6, 2000.

(51) Int. Cl.
*G06F 9/45* (2006.01)

(52) U.S. Cl. .......................... 703/22; 702/186; 703/21; 715/523; 718/105

(58) Field of Classification Search ................ 703/22, 703/21; 702/186; 715/523; 718/105
See application file for complete search history.

(56) References Cited

U.S. PATENT DOCUMENTS

| | | | | |
|---|---|---|---|---|
| 5,881,268 | A | * | 3/1999 | McDonald et al. ........... 703/21 |
| 6,311,144 | B1 | * | 10/2001 | Abu El Ata .................... 703/2 |
| 6,542,854 | B2 | * | 4/2003 | Yang et al. .................. 702/186 |
| 6,748,569 | B1 | * | 6/2004 | Brooke et al. ............... 715/523 |

OTHER PUBLICATIONS

Papaefstathiou et al., "An Introduction to the Layered Characterisation for High Performance Systems", Research Report CS-RR-335, The University of Warwick, Dec. 5, 1997.*

(Continued)

*Primary Examiner*—Jean R. Homere
*Assistant Examiner*—Herng-der Day
(74) *Attorney, Agent, or Firm*—Microsoft Corporation

(57) ABSTRACT

An infrastructure and a set of steps are disclosed for evaluating performance of computer systems. The infrastructure and method provide a flexible platform for carrying out analysis of various computer systems under various workload conditions. The flexible platform is achieved by allowing/supporting independent designation/incorporation of a workload specification and a system upon which the workload is executed. The analytical framework disclosed and claimed herein facilitates flexible/dynamic integration of various hardware models and workload specifications into a system performance analysis, and potentially streamlines development of customized computer software/system specific analyses.

The disclosed performance technology infrastructure includes a workload specification interface facilitating designation of a particular computing instruction workload. The workload comprises a list of resource usage requests. The performance technology infrastructure also includes a hardware model interface facilitating designation of a particular computing environment (e.g., hardware configuration and/or network/multiprocessing load). A disclosed hardware model comprises a specification of delays associated with particular resource uses. A disclosed hardware specification further specifies a hardware configuration describing actual resource elements (e.g., hardware devices) and their interconnections in the system of interest. The performance technology infrastructure further comprises an evaluation engine for performing a system performance analysis in accordance with a specified workload and hardware model incorporated via the workload specification and hardware model interfaces.

27 Claims, 8 Drawing Sheets

OTHER PUBLICATIONS

Papaefstathiou et al., "A Common Workload Interface for the Performance Prediction of High Performance Systems", IEEE Int. Symp. on Computer Architecture, Workshop on Performance Analysis in Design (PAID'98) Jun., 1998.*

Fahringer, Thomas, "Estimating and Optimizing Performance for Parallel Program", *IEEE*, 28(11):47-56, (1995).

Cao, J., et al., "Performance Modelling of Parallel and Distributed Computing Using Pace", IEEE International Performance Computing and Communication Conference (IPCCC-200), Phoenix, USA, pp. 1-8, (Feb. 2000).

Parashar, Manish, et al., "Compile-Time Performance Prediction of HPF/Fortran 90D", IEEE Parallel & Distributed Technology, 4(1):57-73, (1996).

Smith, C.U., "Performance Engineering of Software Systems", Addison-Wesley Publishing Company, pp. 1-570, (1990).

http://www.perfeng.com, copy of home page of Internet website.

Harrison, P.G., "Performance Modelling of Communication Networks and Computer Architectures", (Addison-Wesley Publishing Company) pp. 1-472 (1993).

Bhuyan, Laxmi, N. et al., "Performance of Multiprocessor Interconnection Networks", (Feb. 1989) pp. 25-37.

Bajaj, Sandeep, et al., "Improving Simulation for Network Research", University of *Southern California Science Department Technical Report* 99-702B, Mar. 1999 (revised Sep. 1999), pp 1-11.

Nelson, Randolph, et al., "Performance Analysis of Parallel Processing Systems", *IEEE Transactions on Software Engineering*, 14(4):532-(Apr. 1988).

Jain, Raj, "The Art of Computer Systems Performance Analysis" Techniques for Experimental Design, Measurement, Simulations and Modeling, (John Wiley & Sons, Inc.) pp. 1-685, (1991).

* cited by examiner

DOD - Document Object Model

|     | Event Object Element | Source | Description |
|-----|---------------------|--------|-------------|
| 400 | Event list | Workload | Reference to system, processor, or process event list |
| 402 | Device | Workload | Reference to hardware device |
| 404 | Model | Workload | Reference of model hardware device to support multiple models for device |
| 406 | Resource Usage Data | Workload | Input to the hardware device models (XML script) |
| 408 | Inter-event relation | Workload | Reference to other event representing component interactions |
| 410 | Duration | hardware model | Duration of event determined from hardware model evaluation |
| 412 | Output traces | hardware model | Detailed hardware model performance traces. (XML script) |

FIG. 5

|     | Class Name | Description |
|-----|-----------|-------------|
|     | *Workload Model API* | |
| 500 | pti_workload | Define workload and evaluation modes |
| 502 | pti_ddpar | Handle data dependent parameters |
| 504 | pti_register | Register models to the evaluation engine |
|     | *Hardware Model API* | |
| 506 | pti_hmod | Hardware model services |
| 508 | pti_event | Event handling |
| 510 | pti_eviter | Event iterator through event list |
| 512 | pti_accevlist | Iterator though event lists |
|     | *Hardware & Model Configuration API* | |
| 514 | pti_hmc | Hardware & model configuration |
|     | *Output Trace API* | |
| 516 | pti_otrace | Output trace processing |

FIG. 6

WSL - Workload Specification Language, EE - Evaluation Engine

PERFORMANCE TECHNOLOGY INFRASTRUCTURE FOR MODELING THE PERFORMANCE OF COMPUTER SYSTEMS

This application claims the benefit of Provisional Application No. 60/209,759, filed June 6, 2000.

CROSS-REFERENCE TO RELATED APPLICATION

This application is related to co-pending application by Papaefstathiou, U.S. patent application (Ser. No. 09/632,522), filed Aug. 4, 2000, entitled: "A METHOD AND SYSTEM FOR PREDICTING COMMUNICATION DELAYS OF DETAILED APPLICATION WORKLOADS," and now issued Aug. 2, 2005, as U.S. Pat. No. 6,925,431 and that is explicitly incorporated herein by reference in its entirety, including any appendices and references therein.

AREA OF THE INVENTION

The present invention generally relates to the area of methods and systems for predicting workload response of computer systems. More particularly, the present invention concerns apparatuses and methods performed by such apparatuses for predicting workload response of computer systems.

BACKGROUND OF THE INVENTION

Computer technology development and marketing is experiencing a shift from a product-oriented to a service-oriented business. The World Wide Web and wider adoption of distributed computing architectures have resulted in heightened interest in, and expansion of service-oriented software beyond database servers to application servers. Rather than licensing/purchasing software and executing the software on a local computer, in a service-oriented market users purchase/license/lease a service provided by a software service provider. Payment is based upon monitored use of the service. In such cases, the software service executes at a remote location in response to local user requests.

Performance is, for application server systems, a central issue that largely determines the level of success of such software systems. The shift to services provided via central servers to many clients over a network has created a heightened interest in determining, at a development/installation stage, the capabilities of a service to meet the needs of an expected set of users. Effectively modeling expected load conditions and computing capabilities of the network and server configurations to meet the load conditions is thus becoming more important. Thus, the shift toward service-oriented software has resulted in a new emphasis on certain aspects of software service features that were less important in desktop software development such as maintainability, scalability, and availability.

Successful design of service-oriented software/systems mandates performance analysis. Accurate prediction and analysis of performance under a variety of load conditions and system configurations is an essential component to proper development and deployment of service-oriented systems. Such accuracy can only be achieved by sophisticated performance technology.

Performance technology, comprising computer system workload response tools, is becoming an indispensable element for development of modern web-based and highly distributed systems. The nature of such modern systems requires developing smart applications that handle varying system configurations and dynamic environments. Performance technology tools, by providing expected response measures under defined conditions, facilitate creating responsive software and predicting performance characteristics of a particular execution environment. After software is developed, predictive models generated by performance technology tools can be used during execution of applications to guide mapping of tasks, scheduling, and dynamic load balancing.

Predicting software performance under a wide variety of conditions is a difficult task that requires considering both the complex nature of software and hardware. A limited set of tools and techniques are currently available that model realistic workloads. However, these models focus upon performance of the hardware systems. For the most part, none of this limited set of tools is used to aid development of commercial software. An exception to the above general statement is software performance engineering.

Software performance engineering is an emerging discipline that incorporates performance studies into software development. Software houses consider performance issues after the source code implementation, when monitoring tools can be employed to measure and analyze possible bottlenecks. However, such an approach may result in identification of a problem at a stage in development when it is too late to remedy discovered design flaws.

Academia has studied system performance for decades, and a multitude of performance models have been developed for hardware components. These models use different evaluation approaches and have diverse workload specification requirements. Workload definitions have been extended from basic statistic-based definitions to detailed descriptions that capture application control flow and interactions.

Performance specification languages provide formalism for defining application behavior at various levels of abstraction. The performance specification languages can be used to prototype the performance of an application or represent the performance characteristics of the source code in detail.

Another aspect of performance analysis is display of results in a form that is readily understood by users. A variety of visualization tools at the front-end of performance analysis facilitate identifying bottlenecks and displaying other performance characteristics. Although, as described above, aspects of performance technology are continuously advancing, a breakthrough resulting in wider use of performance technology in software development remains to be seen.

Performance technology, despite its substantial value to successful design and development of service-oriented software, has not been widely integrated into the development process of such software and systems. One possible reason is the amount of resources consumed in modeling the software. Another possible factor is the limited applicability of the developed models to real world situations. Because of the cost in developing models, only a few are developed. The developed models, once developed, are used to model a variety of software systems and configurations. In some instances the models only remotely resemble the actual software system under development.

Adding to the difficulty of developing new, more accurate, models is the cost of modifying existing models to suit a variety of hardware configurations. Currently existing tools and techniques do not separate hardware models from the expected workload conditions. The specification of delays, for example, incorporates both the workload as well as the hardware model upon which the workload is executed. One cannot be modified without affecting the other.

SUMMARY OF THE INVENTION

The present invention comprises an infrastructure and a set of steps for evaluating performance of computer systems. The infrastructure and method provide a flexible platform for carrying out analysis of various computer networks under various workload conditions. The above feature of the present invention is achieved by enabling independent designation/incorporation of a workload specification and the system upon which the workload is executed. The analytical framework disclosed and claimed herein facilitates flexible/dynamic integration of various hardware models and workload specifications into a system performance analysis, and potentially streamlines development of customized computer software/system specific analyses.

In accordance with the present invention a performance technology infrastructure includes a workload specification interface facilitating designation of a particular computing instruction workload. The workload comprises a list of resource usage requests. The performance technology infrastructure also includes a hardware model interface facilitating designation of a particular computing environment (e.g., hardware configuration and/or network/multiprocessing load). In an embodiment, the hardware model comprises a specification of delays associated with particular resource uses. In accordance with a particular embodiment of the present invention, the hardware model further specifies a hardware configuration describing actual resource elements (e.g., hardware devices) of the system of interest. The performance technology infrastructure further comprises an evaluation engine for performing a system performance analysis in accordance with a specified workload and hardware model incorporated via the workload specification and hardware model interfaces.

In accordance with a particular embodiment of the present invention, the evaluation engine interfaces are implemented using XML (Extensible Markup Language) thereby providing any easy, template-based, partial program that is completed by integrating a specified workload and hardware and model configuration definition specified by XML scripts.

In accordance with yet another particular embodiment of the present invention, a performance tool analysis interface is specified enabling a variety of performance analysis tools to be employed to interpret the raw output of the evaluation engine.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 5 is a table summarizing a set of element types within an event object in accordance with an embodiment of the present invention;

FIG. 6 is a table summarizing a set of API classes providing an interface framework between the evaluation engine and the workload, hardware model, hardware and model configuration, and output trace components of the PTI in accordance with an embodiment of the present invention;

DETAILED DESCRIPTION OF AN ILLUSTRATIVE EMBODIMENT

One of the reasons for limited use of performance technology to design service-oriented software is the absence of an environment that can easily integrate different hardware models, workload specifications, and performance analysis tools. A performance technology infrastructure (PTI) and methods disclosed herein below address the above-mentioned shortcomings of prior systems and methods for evaluating software performance in various computing environments.

The PTI is a framework/platform including an evaluation engine. The PTI is augmented, through interchangeable integration of designated hardware models, workload specifications, and output analysis tools, to comply with requirements of a particular performance study. The PTI provides a standard interface between the four main components of a performance system (workload, hardware models, system and model configuration, and output). Integrating the individual components into the PTI is advantageously realized, in an embodiment of the present invention, using Extensible Markup Language (XML) scripts. The XML scripts facilitate a standard extensible interface between an evaluation engine and the hardware models, workload specifications, and performance analysis tools.

The exemplary embodiment of the PTI, disclosed herein, provides an integration platform for conveniently integrating multiple different performance tools and models. The PTI architecture is capable, through defined application program interfaces (APIs), of integrating third party hardware models, workload specifications, and performance analysis tools. XML-based APIs facilitate integrating these third party "extensions" into the PTI to render a wide variety of software/systems analyses in a variety of output formats.

Figure 2:
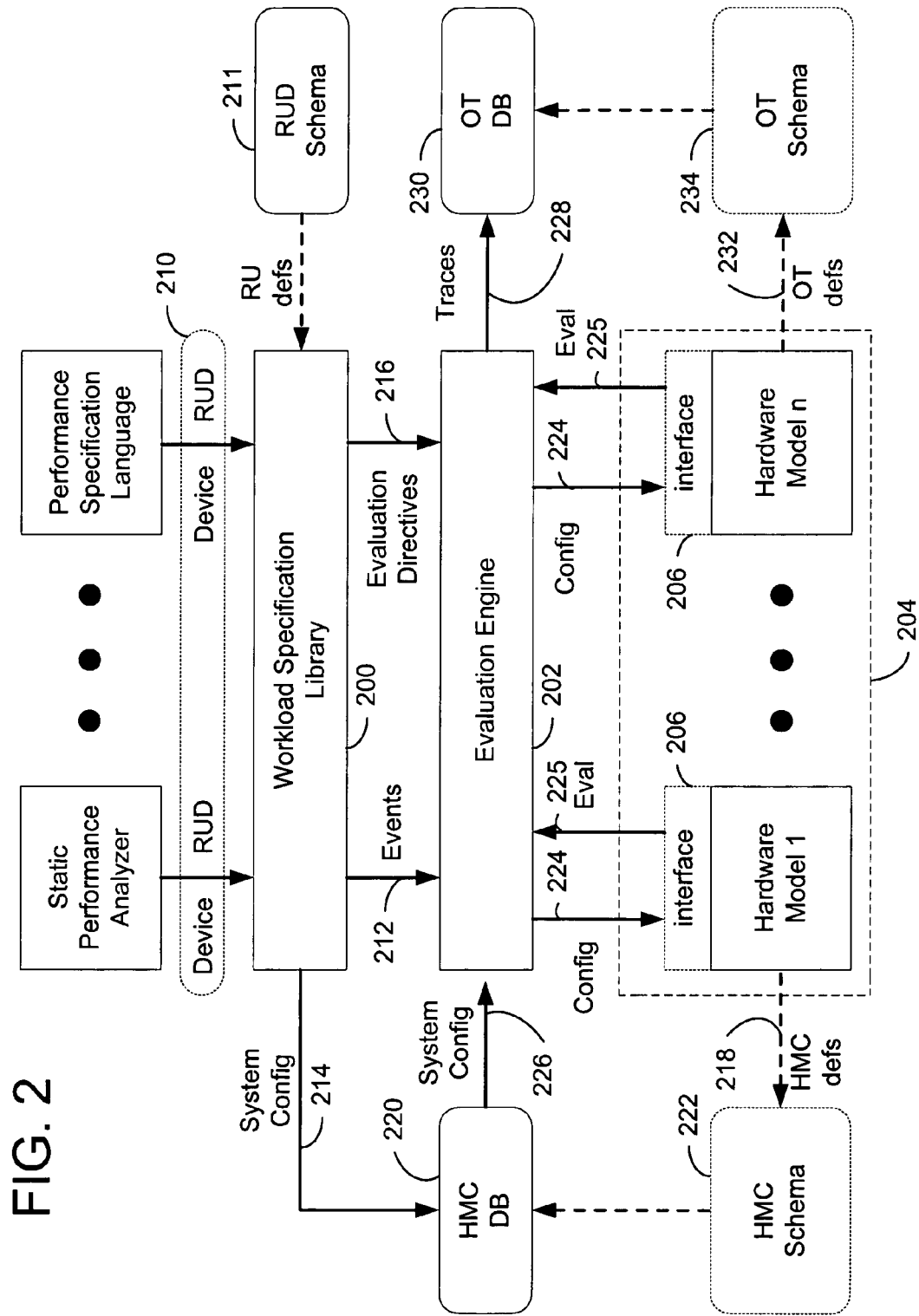
FIG. 2 is a schematic drawing depicting, at a high level the components and information flow of a system embodying the present invention.

The basic PTI architecture includes three components: 1. a workload specification library (WSL), 2. an evaluation engine (EE), and 3. hardware models. An overview of the PTI architecture is schematically depicted in FIG. 2 described herein below. The workload specification library and hardware models are separate, independently designated suppliers of evaluation data to the evaluation engine. The evaluation engine allows combining different workload specification and hardware model technologies into a single performance analysis model.

Instances of workload specifications within the WSL comprise a list of hardware or virtual device usage requests. Hardware devices represent system components (e.g., a CPU). Virtual devices are generally resources that are not tied to a particular piece of hardware. A representative example of a virtual device is a software library. The use of a device is configured with Resource Usage Data (RUD). RUD represents the necessary resources required from the device to perform a task. By way of example, a CPU device is configured with RUDs that include the number of operations performed to complete a particular computation. Underlying hardware models may therefore employ the same or different RUD definitions to perform a particular specified task.

Workload definitions are implemented as a sequence of calls to the evaluation engine via the workload specification library. The WSL also incorporates library calls that configure hardware models and guide the evaluation process.

The evaluation engine combines workload information with the underlying hardware models to predict the performance of a particular defined system. In an exemplary performance analysis method, the evaluation of a particular system definition comprises a set of stages. Initially, the hardware models are configured to reflect the characteristics of the system. The system and hardware model configuration are determined in the Hardware and Model Configuration (HMC) database. The user configures the HMC database by defining HMC scripts. During a second stage, involving the workload specification library, the evaluation engine stores a sequence of device calls and corresponding RUDs associated with a specified workload. After the specified workload (or portion thereof) has been processed, during a third stage the evaluation engine assembles the resulting device interactions and calls the appropriate hardware models. During a fourth stage, the evaluation engine combines the device model predictions rendered during the third stage to predict the overall performance of the system. The evaluation process and detailed operation of system components are captured, for additional processing, in an output trace database.

With regard to the third stage, the evaluation engine interacts with the hardware models through a hardware model interface (HMI) library. The HMI isolates the idiosyncrasies of the models from the evaluation engine operations. The hardware models can be analytical, statistical, characterization, simulation, etc. Through the HMI the evaluation engine configures the hardware models, passes workload specifications, and evaluates the workload specifications in combination with the hardware models.

Figure 1:
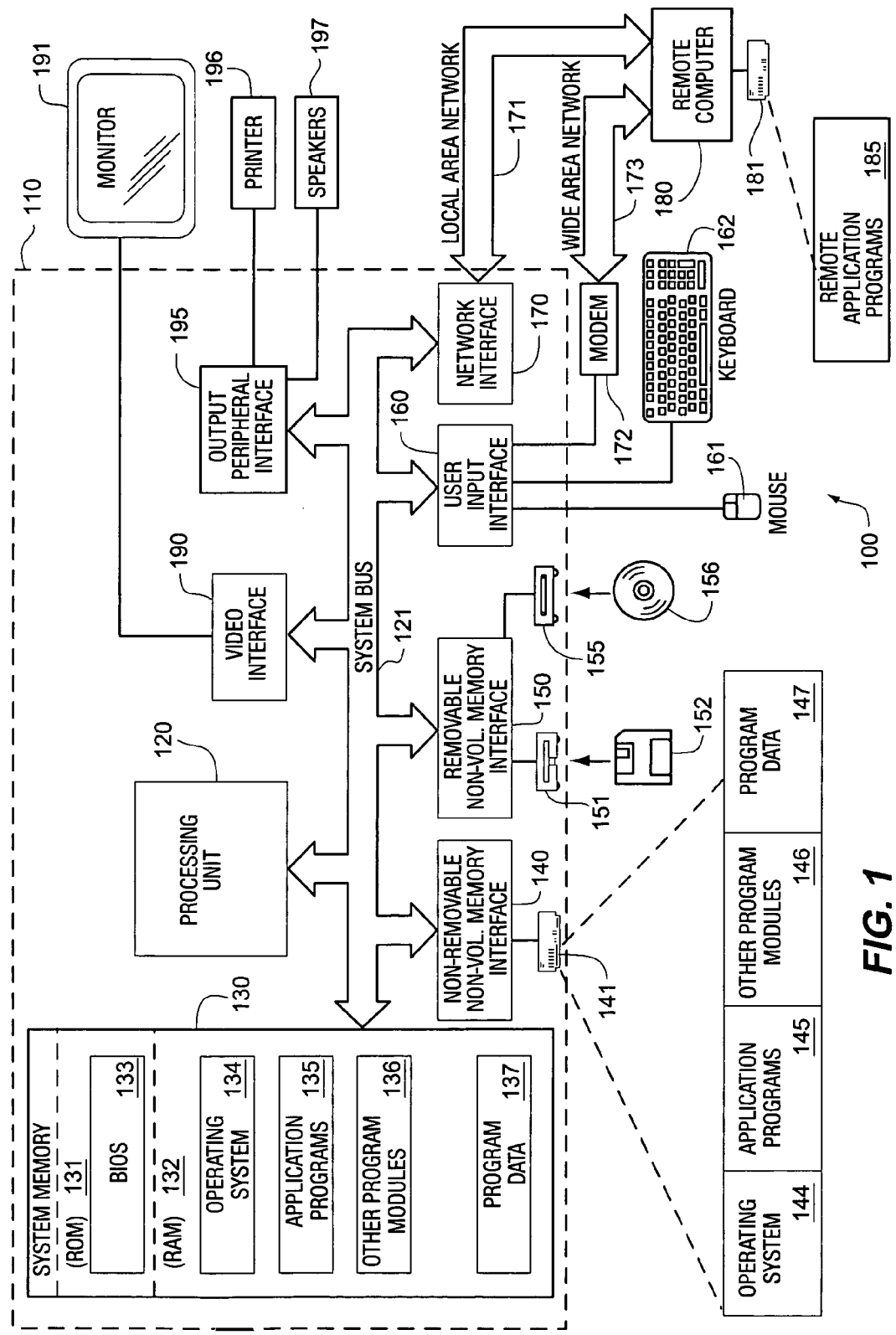
FIG. 1 is a schematic drawing illustratively depicting an exemplary operating environment for carrying out an embodiment of the present invention.

FIG. 1 illustratively depicts an example of a suitable operating environment 100 within which the invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Having described exemplary computing environments in which the present invention is carried out, attention is directed to FIG. 2 that schematically depicts an illustrative embodiment of a performance technology infrastructure (PTI) for performing software system analyses. In general, the PTI architecture depicted in FIG. 2 provides an extensible framework that can be augmented with desired hardware models, configurations and/or workload specifications to comply with the requirements of a performance study. The primary components of the architecture and the component interactions are described herein below. The integration of components is facilitated by the use of XML scripts that provide a standard extensible interface between an evaluation engine and user-designated workloads, hardware models, hardware configurations, and performance analysis tools.

The core of the PTI architecture includes three components: a workload specification library (WSL) 200, an evaluation engine (EE) 202, and hardware models 204. An overview of the PTI architecture is shown in FIG. 2. The evaluation engine 202 allows the combination of differing workload specification and hardware model technologies into a system performance analysis model.

The workload specification library 200 comprises a list of hardware or virtual device usage request descriptions. Hardware devices represent system components such as a CPU. Virtual devices represent computer resources that are not associated with a particular tangible hardware device. An example of a virtual device is a software library. An example of a virtual device request description is the use of a message-passing library such as Message Passing Interface (MPI) to define a communication pattern. In an embodiment of the present invention the request descriptions within the workload specification library 200 also specify a type of hardware model. The identified model type is subsequently used, during the evaluation stage, to determine a delay associated with the identified usage request by referencing a corresponding entry in the hardware models 204.

A single device usage request can be processed in conjunction with any of an extensible group of hardware models. This is accomplished by loading various hardware models into the hardware models 204. The present invention facilitates substituting one model with another model without the need to re-write or re-compile a workload specification associated with a software system analysis. Matching workload descriptions to the underlying hardware models for a specific performance study is performed in the hardware and model configuration stage described below.

Depending on the requirements of a performance study, a specific hardware model is selected for a type of device. Factors influencing the particular hardware model selected in the system include, by way of example, speed of evaluation or accuracy of the model. Such hardware model selections/substitutions may alternatively arise in response to changed status of a system. Because a hardware model can be substituted without re-writing or re-compiling a performance analysis workload specification, the performance technology infrastructure disclosed herein is designed to facilitate users changing the model and system configuration designation before or during an evaluation of a system model. This feature is intended to support system models that are evaluated during execution of an application to guide a performance related task. During the evaluation of the model, system characteristics may change (e.g., network background load changes). A monitoring sensor can forward the status change to the system model and update the model configuration DOM object.

The evaluation engine 202 utilizes different hardware models stored in the hardware models 204 in a variety of evaluation strategies. Hardware model interfaces (library) 206 enable the evaluation engine 202 to interact with the hardware models 204. The hardware model interfaces 206 isolate idiosyncrasies of the individual instances of the hardware models 204 from the evaluation engine 202 operations. The component models can be in virtually any form including, by way of example: analytical, statistical, characterization, or simulation. Through hardware model interfaces 206 the evaluation engine 202 configures the hardware models, passes workload specifications, and integrates the calculated hardware device delays within the overall delay model.

The evaluation engine 202, in accordance with an embodiment of the present invention, includes three types of function calls: a declaration of a device usage followed by the related resource usage data (RUD), hardware and model configuration function calls, and function calls directing completion of a system performance evaluation process.

The evaluation engine 202 is an event-based processing component of the performance technology infrastructure. The evaluation engine 202 processes event lists representing system components (processors, processes, threads) and processes events defined within the event lists to characterize the use of devices. Interactions of the system components such as synchronizations, communications, and sequencing of shared device usage correspond to event associations performed by the evaluation engine 202. The event-based approach is a flexible technique to capture various types of component associations.

On the workload specification side of the illustratively depicted PTI architecture, system use under software load is specified in the form of resource usage data (RUD) 210. The resource usage data represents resources required by an identified device to perform a task specified by the modeled software. For example, a particular computation task specified for modeled software is specified in resource usage data as an identified CPU device and a number of operations executed by the identified CPU device to complete the computation task. An RUD schema 211 stores RUD syntactic rules to guide interpreting RUDs supplied in a variety of formats to the workload specification library 200.

The exemplary embodiment of the PTI uses a MICROSOFT XML 2.5 processor to define and process XML RUD scripts. RUD type definitions are stored in the RUD schema 211 comprising RUD definitions written in the XML-Data language. Device RUDs defined in the workload received by the workload specification library 200 are initially processed by an XML Document Object Model (DOM) processor of the workload specification library 200. The XML DOM processor parses workload device RUDs based on the syntax and rules defined in the RUD schema 211. The processor builds a tree structure within the DOM object for the received device RUD according to an RUD script definition supplied by the RUD schema 211. The resulting DOM objects are processed by the evaluation engine 202. During processing of the DOM objects, a hardware model from the hardware models 204 accesses and manipulates the elements, values, and attributes of RUDs within the DOM object.

As an example of the independence of workload and hardware models, hardware models corresponding to particular device RUDs provided to the workload specification library 200 may employ the same or different RUD definitions for a particular specified task. For example, calls to a communication send function between two computers of an MPI virtual device are specified in a workload with an RUD definition that includes the source processor, the target processor, and the length of the message. However, the corresponding hardware model might include a detailed simulation of the network or a statistical regression model. On the other hand, both the workload specification and hardware models can use the same RUD definition. What is of particular importance is that the workload and the hardware model need not utilize the same RUD definition for a particular operation or task.

Workload specifications are implemented as a sequence of event calls 212 to the evaluation engine 202 via the workload specification library 200. The workload specification library 200 includes routines for issuing system configuration calls 214 that configure hardware models in a hardware and model configuration database 220 in the event that a particular desired hardware model does not exist or differs from one that would otherwise be selected by the evaluation engine 202 from the hardware models 204. The workload specification library 200 also supplies evaluation directives 216 guiding execution of the evaluation process by the evaluation engine 202. The evaluation directives 216 enable a user to replace a default evaluation process performed by the evaluation engine 200 by an alternative evaluation procedure. The evaluation process and examples of alternative procedures are presented herein below.

The evaluation engine 202 processes workload information (events 212) in accordance with hardware models 204 to provide modeled performance information. Hardware models 204 are configured to reflect the characteristics of the system. Another role of the hardware models 204 is to supply hardware and model configuration definitions 218. The configuration definitions 218 are incorporated into an XML HMC schema 222. The definitions 218 are incorporated into the XML HMC schema 222 that, in turn, supplies syntactic rules for defining an XML script representing a configuration in a hardware and model configuration (HMC) database 220. A user configures the HMC database 220 using system configuration calls 214 issued by the workload specification library 200 during initialization. The resulting hardware and model configuration information 226 is provided by the HMC database 220 to the evaluation engine 220.

In an embodiment of the present invention, during initialization the evaluation engine 202 reads the HMC database 220 and creates a document object model (DOM) object from the hardware and model configuration information 226. The evaluation engine 202 creates a representation (e.g., a graph) of a hardware model where nodes correspond to computers or networks, and edges correspond to network connections. The evaluation engine 202 associates each node of the hardware model representation with an XML tree DOM object that includes configurations of the node models. The evaluation engine 202 applies the hardware and model configuration to a workload specification to create event lists and establish time delays (based upon underlying hardware models 204) for the events described in the workload specification.

The evaluation engine 202 stores the sequence of events 212 and associated RUDs 210. The evaluation engine 202 organizes the device interactions arising from the received events 212 and issues configuration calls 224 to the appropriate ones of the hardware models 204 based upon the supplied hardware and model configuration information 226. In response, the called hardware models 204 return delay evaluations 225. As an example of a device interaction, in the case of an MPI send call, a source and target processor have an execution dependency. The evaluation engine 202 combines the device model delay predictions, including resolving any resource conflicts and dependencies, to predict the overall performance (delay) of the system for the MPI send call.

After processing the received events 212, the evaluation engine 202 stores a set of output traces 228 in an output trace database 230. The output traces 228 incorporate delays (including resource use conflicts and interdependencies) associated with performing the events 212 in the system represented by the hardware and model configuration information 226 and referenced ones of the hardware models 204. The output trace information in the output trace database 230 is provided according to syntactic rules specified by an XML output trace schema 234. The output trace schema 234 incorporates output trace definitions 232 supplied by the hardware models 204.

The supply of predictive traces to the output trace database 230 is guided and facilitated by the list of events generated during the model evaluation described herein. The evaluation engine 202 generates detailed traces corresponding to the duration and interaction of events within processed event lists. Mapping traces from a PTI-specific format to a standard trace format (e.g. SDDF) is straightforward and will be known to those skilled in the art.

A standard output trace format defined by an XML output trace schema can be extended to include hardware model component-specific (e.g., hardware-specific) traces by extending the output trace schema 234 (e.g., via definitions 232). In such instances, a standard XML output trace is integrated with component-specific traces. The output traces are stored in XML format and can be further processed by performance analysis tools. The hardware component specific traces can be filtered for analysis tools that do not support them. The output trace XML output trace schema 234 includes definitions for the standard PTI traces and definition of the hardware model trace extensions.

In the embodiment depicted in FIG. 2, the workload specification library 200 receives the device RUDs and renders a set of events to be processed by the evaluation engine 202. However, in an alternative embodiment, the functionality for generating an event list is incorporated into the evaluation engine 202. The evaluation engine 202 calls upon the RUD/event conversion descriptions and/or processes to render a set of events. The location of the execution engine for carrying out the conversion of device RUDs to generalized events processed by the evaluation engine is not important. Rather, the PTI's advances and advantages arise from separating a workload description from underlying hardware models referenced by an evaluation engine to generate a performance estimate/analysis for the described workload.

Having described the functional components of the PTI architecture, illustrative examples of the content and form of the input to the PTI are now provided. Workloads are specified in a workload input file as a set of library calls to the workload specification library 200. As those skilled in the art will readily appreciate, the form of the raw input may take a variety of forms. The raw input is converted to standardized input format facilitating generating event lists. The conversion may be performed by hand or by automated processes including interprets, translators, command execution, etc.

By way of example, a user writes a program including a series of calls to the workload specification library 200, or alternatively uses a front-end input processor that generates the desired calls to the workload specification library 200 based upon a high level description of a workload model to simplify the workload definition process. Existing workload definition tools can be adjusted to support the PTI. These tools include, by way of example, static performance analyzers (SPAs), performance specification languages (PSLs), graphic design modeling tools (GDMTs), and monitoring traces. Other presently known and future developed workload definition tools may also be used to generate workload input. As will be evident from their descriptions below, a variety of workload inputs are contemplated for use in association with the disclosed PTI architecture.

Known SPAs construct software models encapsulating the static performance characteristics of software applications. SPAs translate application source code to a notation (e.g., a set of events) capturing application control flow and the frequency with which operations are performed. Dynamic characteristics of the application such as problem size are incorporated within a workload description as data dependency parameters. Users specify the data dependency parameters before the model evaluation.

PSLs have been developed to enable users to determine performance characteristics of a particular system of interest. PSLs are employed in the design stage of software development to prototype the performance characteristics of the application. PSLs are used in later stages of software development to experiment with new software designs and configurations. For example, a software developer can create a PSL model of a sequential application model created by SPAs to experiment with the performance characteristics of numerous scenarios involving parallel processing.

GDMTs support graphical representation of the software structure (e.g., flowcharts) and can be used as performance prototyping or analysis tools. In this case a graphically depicted representation of program flow would be captured and converted into a set of device/resource requests.

Monitoring traces, existing on virtually the opposite end of the spectrum of workload input sources of GDMTs, are created by executing (or simulating executing) an application. Monitoring traces are, by way of example, utilized to perform capacity planning studies. "What-if" scenarios are studied for the effects of system component modifications.

In an embodiment of the PTI, a hardware model may be utilized with different workload description requirements, and vice versa. RUD type definitions (e.g., RUD schemas) capture the characteristics of the workload description. One type of RUD includes a simple list of arguments. Another RUD type supports describing workload as a control flow structure.

An example of a device RUD, provided in the form of an XML script, is now provided for a call to a synchronous MPI send. This event is defined in the workload specification library 200 as a call to MPI_send in the workload specification library 200 followed by an RUD description including the source processor, the target processor, and the length of the message. The RUD for the synchronous MPI send operation is defined, within the workload specification library 200, by the following XML script:

```
<rud device="MPIsend">   <!-- RUD for MPI send function -->
<src>1</src>             <!-- Source processor -->
<trg>10</trg>            <!-- Target processor -->
<len>1024</len>          <!-- Length of message (in bytes) -->
</rud>
```

Other devices include more complex RUD definitions. For example, an XML script reproduced below for a CPU device models a computational segment that includes the control flow of a computation. The model RUD specifies a frequency of language operations and corresponding control flow constructs. In the following example a code segment from the Alternative Direction Implicit (ADI) solution to a partial differential equation is modeled by the following XML script:

```
<!-- C code defined as a CPU RUD
    for(i=0; i < MY_SIZE; i++ )
        if( (j >= 2) && ( j != SIZE_J) ) {
            fact = a/b[j−1];
            d [i] [j] = d[i] [j] −fact*d [i] [j−1];
        }
-->
<rud device="CPU"> <!-- RUD for CPU model -->
<loop iter="MY_SIZE" type="clc" of="LFOR, CMLL, INLL">
    <compute type="clc" of="2*CMLL, ANDL">
    <case type="clc" of="IFBR">
      <branch exprob="0.9">
         <compute type="clc" of="ARF1, 3*ARF2, DFSL, 2*TFSL, MFSL, AFSL">
      </branch>
     </case>
</loop>
</rud>
```

The loop tag includes an "iter" attribute defining a quantity of loop iterations. An "of" attribute includes a cost for executing the loop header in terms of C language statements. The "type" attribute defines a type of operation frequency counts—C language statement in this case. Similarly "compute" and "case" respectively represent a computational segment and a conditional statement. The "branch" tag corresponds to a branch of the conditional statement. An "exprob" attribute is a probability of executing the branch. Control flow statements include data and system dependency information. The control flow statements can be static such as the branch execution probability or dynamic such as the loop iteration count "MY_SIZE." Before evaluating the model a user specifies the value of the dynamic RUD parameters.

Though not required to carry out the present invention defining workload in terms of XML scripts offers advantages over other programming languages when defining and processing device RUDs. First, a hardware model developer is provided the opportunity to either use an existing RUD definition or to create a new type. Second, as demonstrated by the two above examples, the range of complexity (or simplicity) of the RUD type definitions is unlimited. A RUD type definition can be a simple list of arguments or a complex composition of control structures. Third, XML processors simplify parsing and accessing XML data. XML provides a framework for defining standard RUDs that can be used (and reused) by different models and tools.

Having described exemplary workload input, attention is now directed to the hardware and model configurations accessed by the evaluation engine 202 during the course of processing a workload specification for a particular performance analysis. The performance technology infrastructure provides a dynamic approach for system and model configuration. A system component and model configuration is defined in the hardware and model configuration database 220 separate from workload specifications. The HMC database 220 is, by way of example an XML script defined according to syntactic rules specified in the hardware and model configuration schema 222.

An example of a simple XML hardware and model configuration tree is:

```
<system name="pc_cluster">
    <computer name="pc_node" count="16">
        <cpu_clc> <!-- CPU Model C Language Operations -->
```

-continued

```
        <DILG>0.043</DILG>
        <IADD>0.127</IADD>
        <!-- Other operation follow -->
        </cpu_clc>
    </computer>
    <network name="myrinet">
      <ccmod>
        <Nproc>16</Nproc>
        <-- other configuration follow --->
      </ccmod>
    </network>
    <connect>
       <computer name="pc_node" node="1">
       <network name="myrinet" port="1">
    </connect>
    <!-- Connection to other nodes follow -->
</system>
```

The above XML script specifies a sixteen-node PC cluster interconnected by means of a Myrinet System Area Network. A "computer" tag defines the PC nodes and configures/defines a CPU hardware model by defining the cost of C language operations using the "clc" tag. Similarly a "network" tag defines the Myrinet network model. In this particular case a communication contention model "CCMOD" is configured. The functional organization and method steps for generating CCMOD hardware models is set forth, by way of example, in Papaefstathiou, U.S. patent application (Ser. No. 09/632,522), filed Aug. 4, 2000, entitled: "A METHOD AND SYSTEM FOR PREDICTING COMMUNICATION DELAYS OF DETAILED APPLICATION WORKLOADS," and now issued Aug. 2, 2005, as U.S. Pat. No. 6,925.431 and explicitly incorporated herein in its entirety.

Figure 3:
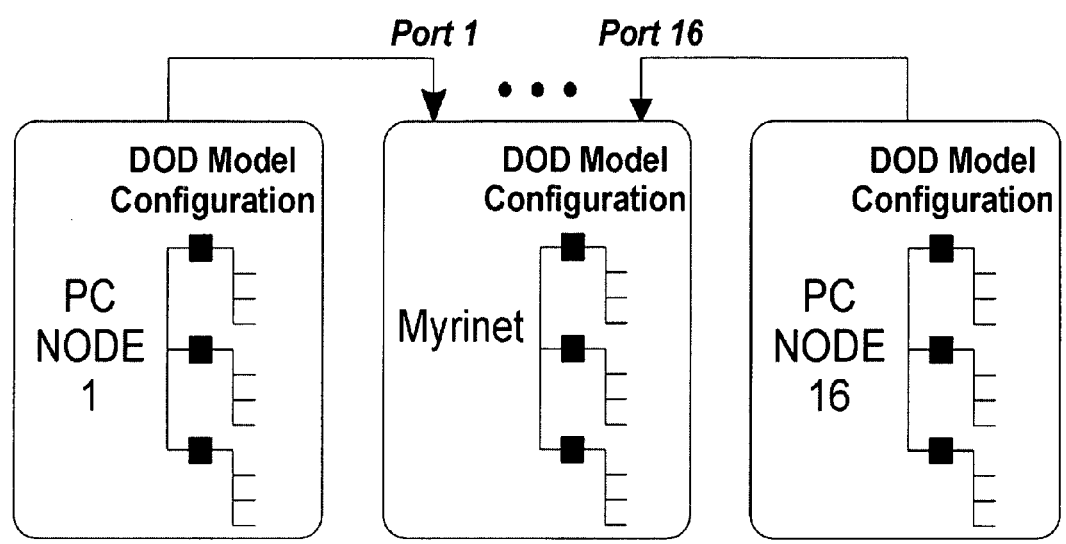
FIG. 3 is a graphical representation of a hardware configuration generated in accordance with a particular hardware and model configuration definition.

The "connect" tag specifies a connection of a PC node to a network port. The evaluation engine 202 uses this configuration to create the representation of the hardware model. A graphical representation of the above defined PC cluster hardware and model configuration is provided in FIG. 3.

Figure 4:
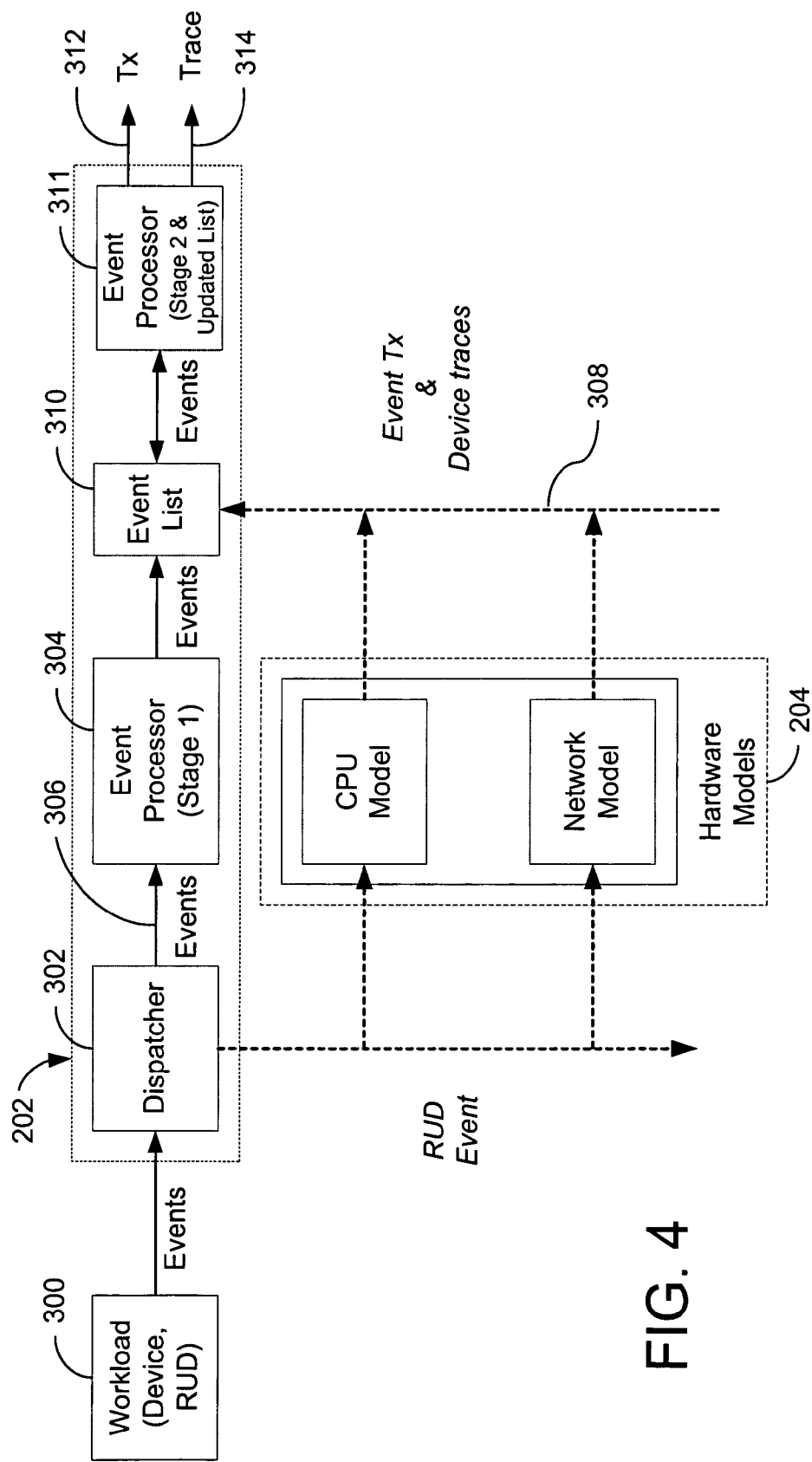
FIG. 4 schematically depicts process flow in an exemplary system embodying the PTI architecture of FIG. 2.

Turning now to FIG. 4, a diagram schematically depicts process flow in an example system embodying the performance technology infrastructure of FIG. 2. Initially a workload specification 300, comprising a set of device RUDs specifying the operation of a modeled software system, is processed in accordance with a workload specification library 200 to render a series of device usage scenarios and their associated device RUDs 300 that are passed, in the form of events (referred to herein as "device RUD events"), to the evaluation engine 202. A dispatcher 302 within the evaluation engine 202 distributes events 306 corresponding to the received device RUD events to an event processor first stage 304. The event processor first stage 304 constructs an event list for each device utilized by the modeled software system. An event provided by the workload specification 300 represents a single request of device usage. The event processor first stage 304 can spawn new events based on the single workload event in order to resolve event interactions. An example is a synchronous communication that takes place between two processors. The workload event corresponds to the send message request from the source processor. The event processor will create an additional event to characterize the receive event that takes place in the target processor.

The processing of device RUD events by the evaluation engine 202 preferably includes passes through two event processor stages. During the pass through the event processor first stage 304, the event processor first stage 304 constructs a raw list of events from input device RUD events in accordance with the workload specification library. The second stage is described below.

Although the device RUD can be used to identify the type of event, the time required to access the device is still unknown after the event processor first stage 304 has constructed the list of events. The dispatcher 302, in accordance with a hardware configuration specified by an XML script from the hardware and model configuration database 220, passes device RUDs associated with particular events through appropriate hardware models 204 to render a set of delays corresponding to the passed events. The designated hardware model applied to an event produces a predicted execution time (event Tx in FIG. 4) based on the events' device RUDs. The designated hardware models 204, in addition to determining delays, produce output traces representing the performance and operation of a hardware configuration for a specific workload scenario. The resulting predicted execution times and output traces 308 are recorded in an event list 310.

After all device RUD events received by the dispatcher 302 have been handled, during the second pass of the event processing, in accordance with an embodiment of the present invention, an event processor second stage 311 resolves event dependencies and accounts for contention (if necessary) with regard to the events stored in the event list 310. The resulting prediction and output traces are recorded in updated fields of the event list 310. For example, when predicting the time for a communication, the traffic on the inter-connection network should be known to calculate channel contention. In addition, messages obviously cannot be received until after they are sent. The exception to this type of evaluation is a computational event that involves a single CPU device—the computation event delay can be determined after the first pass since it does not require interaction with any other events.

The evaluation engine 202 thereafter processes the updated output set of events from the event processor second stage 311 to render output in a variety of forms including output data in the form of: an overall performance estimate for the execution time of the application 312 and traces 314. In the disclosed extensible model, a variety of output formats are possible including graphical traces associating events with particular system devices, bar graphs showing distribution of workload, etc. The structure of the PTI, namely the XML scripts and API interface establishing a standard interface to hardware models, insulates the event list output from idiosyncrasies of both the workload and underlying hardware models. The standardized event list format facilitates use of standardized output. The structure of events is summarized in the table of FIG. 5.

Finally, with reference to the input processing described above, a user can control the input analysis process to optimize evaluation time and minimize memory requirements. For example, rather than processing an entire workload specification, the user can specify a partial evaluation of the event list in any part of the workload. The evaluation engine evaluates the designated events and frees up the memory occupied by the event lists. Applications including many repetitions of the same workload can be modeled by using an analytical repetition evaluation option. In such an instance the user marks the beginning and the end of the repeated workload segment, and the evaluation engine evaluates the repeated set of events only once. The workload can then be repeated without re-evaluating the event lists. The aforementioned operation is performed by a fast analytical evaluation algorithm that takes into account the event relationships but does not require involvement of the hardware models.

FIG. 5 summarizes the structure of a set of event object element types. These elements may be included in any event object. In alternative embodiments of an invention, e.g., where object-oriented programming techniques are not employed, the events may be represented as a set of records with fields corresponding to the object elements described herein below. Certain ones of the event object elements are preferably implemented using XML scripts thereby supporting an extensible platform for future expansion of the types of particular event object elements as the PTI architecture matures.

An event list element 400 is created in accordance with a workload specification. Each instance of the event list element 400 references a system, processor or process event list. A device element 402 also is created in accordance with a workload specification. Each device element 402 references a device (e.g., a processor). A model element 404 is created in accordance with a workload specification. The model element 404 within an event object instance references a particular device model where multiple hardware models are available for a particular device. A resource usage data element 406, a workload element preferably provided in the form of an XML script, describes an actual device usage specified in a workload description. An inter-event relation element 408 is a workload-related object element. The inter-event relation element 408 within an event object instance references another event object with which an interaction dependence exists. A duration element 410, supplied by a referenced hardware model, defines a duration of the event associated with the event object. An output traces element 412, supplied as well by a referenced hardware model, provides detailed hardware model performance traces associated with the RUD provided in the event object.

Having described the functional components of a general system for carrying out an embodiment of the present invention, an exemplary set of workload, hardware model, and hardware and model configuration application program interface components will be described with reference to FIG. 6. The description of APIs herein below assumes an object-oriented implementation. Each API includes a number of classes and each class provides a number services available to the user of the system. The API classes and services are described in detail. PTI related data types used by the services are then described.

A summary of the API classes is shown in the table of FIG. 6. The APIs as well as the data types used by the APIs, are described in greater detail in the Appendix. The interaction of the API classes during stages of a performance study are depicted, by way of example, in FIGS. 7–10. The classes are organized into four groups. Each group represents a different architecture component of the PTI. The four groups identified herein comprise: a workload model interface, a hardware model interface, a hardware and model configuration interface, and an output trace interface. A pti_workload API 500 defines workload and evaluation modes. A pti_ddpar API 502 handles data dependent parameters of workload definitions. A pti_register API 504 facilitates registering a model (any type) to the evaluation engine 202. With regard to hardware and model configuration APIs, a pti_hmod API 506 facilitates defining hardware model services. A pti_event API 508 defines event handling. A pti_eviter API 510 supports defining a single event iteration within an event list. A pti_accevlist API 512 allows specification of iteration of a list of events as opposed to a single event. As discussed previously above, iteration events simplify specifying a workload by defining a sequence of events and then allowing the event sequence to be repeated multiple times without having to define the individual steps. A pti_hmc API 514 is the primary means for defining hardware and mode configuration in association with the HMC database 220. The final API type, associated with output processing, is a pti_otrace API 516 which facilitates designating output trace processing. As those skilled in the art will readily appreciate, the aforementioned APIs are by no means all inclusive. A secondary feature of the PTI architecture is extensibility. In addition, those skilled in the art will readily appreciate that alternative embodiments of the invention will likely include different definitions for the components of the APIs summarized in the APPENDIX.

Figure 7:
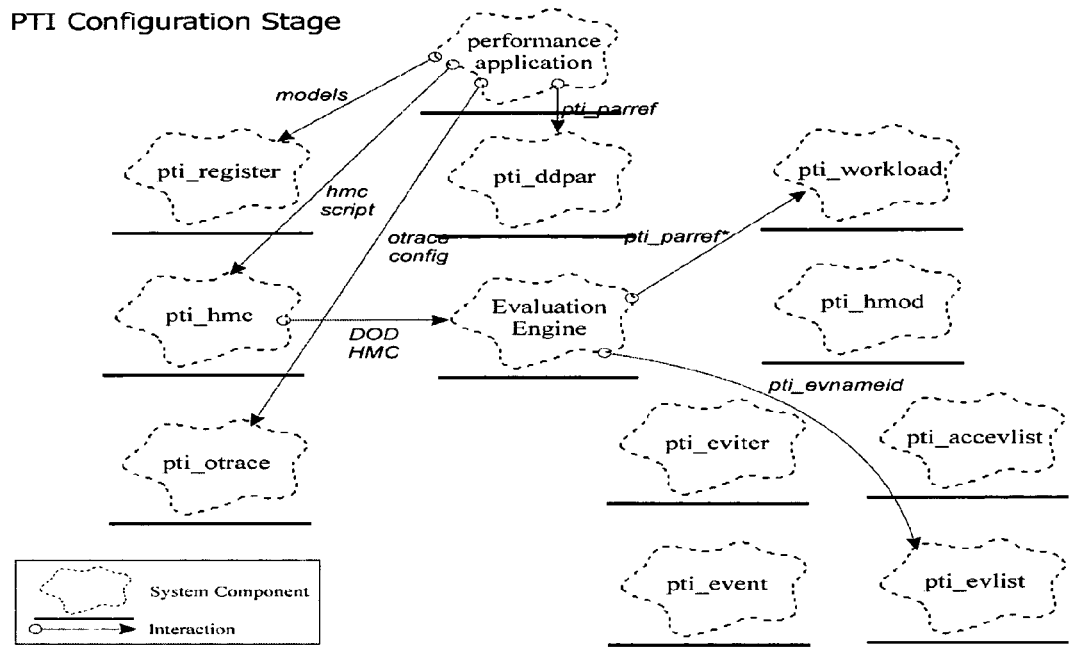
FIGS. 7–10 are schematic drawings visually depicting the interaction between the API classes identified in FIG. 6 during stages of completing a performance study of a system.
Figure 8:
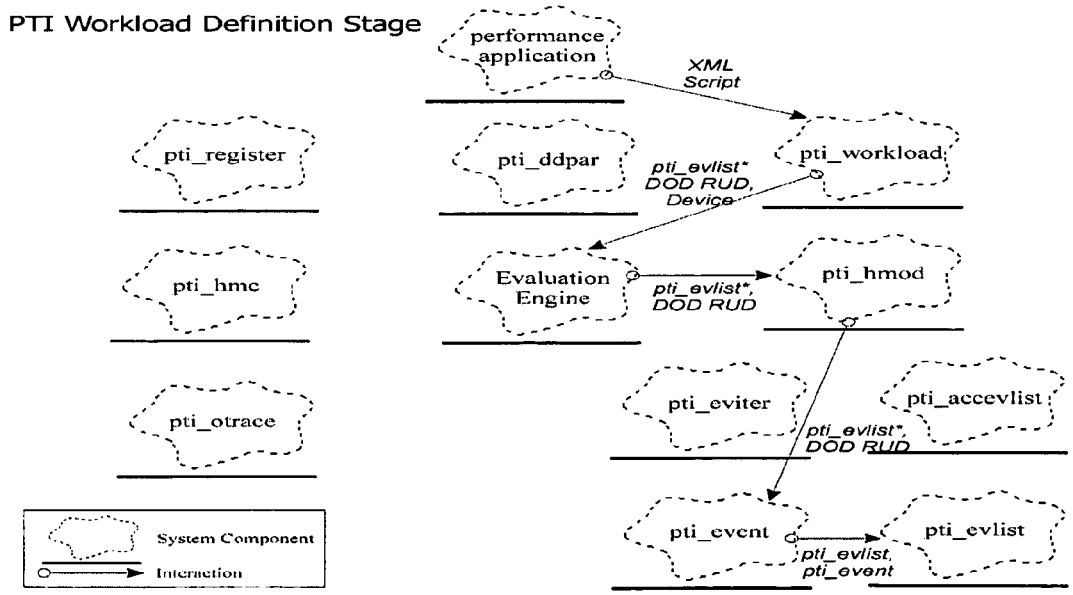
Figure 9:
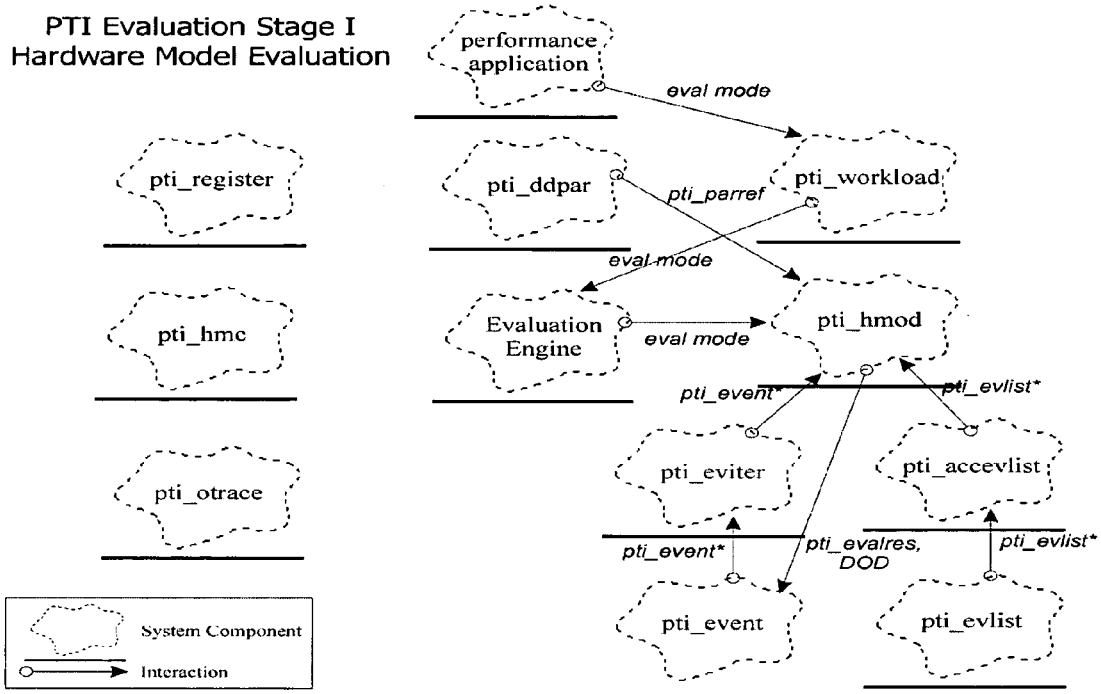
Figure 10:
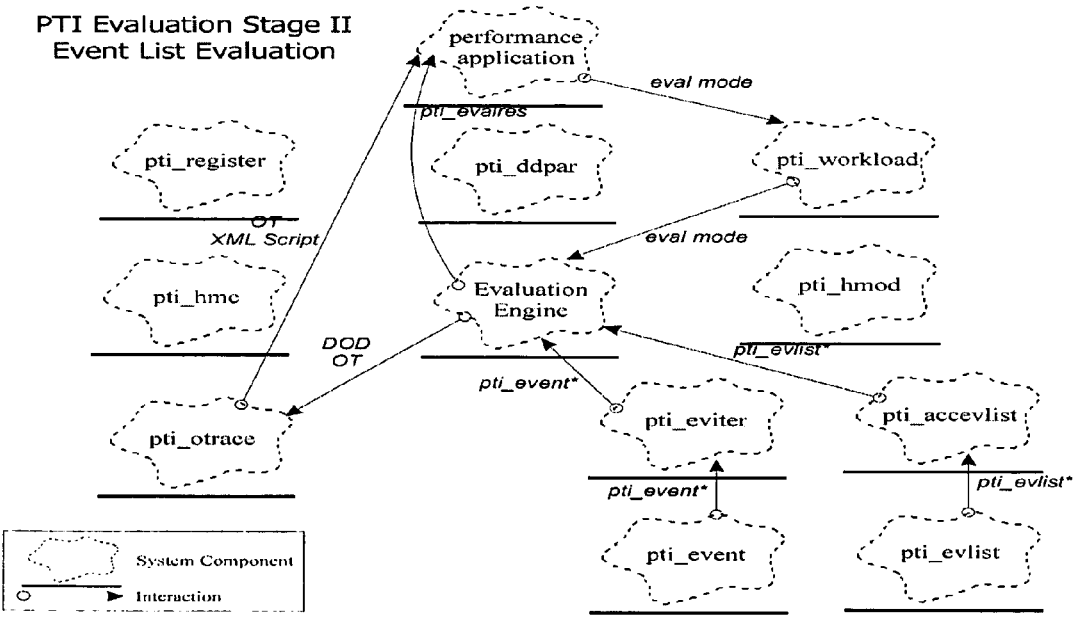

FIGS. 7–10 depict the interaction of the API classes summarized in FIG. 6 and detailed in the APPENDIX, the evaluation engine, and the performance application during four stages of a performance study run. Each blob represents a system component and each arrow represents an interaction. The direction of the arrow shows the flow of data and an associated caption describes the type of data used in the interaction. Turning to FIG. 7, the object interactions are depicted during a configuration stage wherein the evaluation engine 202 issues "create event list" service calls based on a specified hardware and model configuration script from the HMC database 220. The evaluation engine also creates and configures hardware model classes based upon a specified hardware model. FIG. 8 depicts object interaction that occurs during a workload definition stage wherein the evaluation engine dispatches a workload definition to the specified hardware model. FIG. 9 depicts the interaction between object classes when the evaluation engine 202 deploys underlying hardware models. Finally, with reference to FIG. 10, the object interactions are summarized that facilitate the evaluation engine combining the event-prediction-based event list structure to predict an overall system performance.

Figure 11:
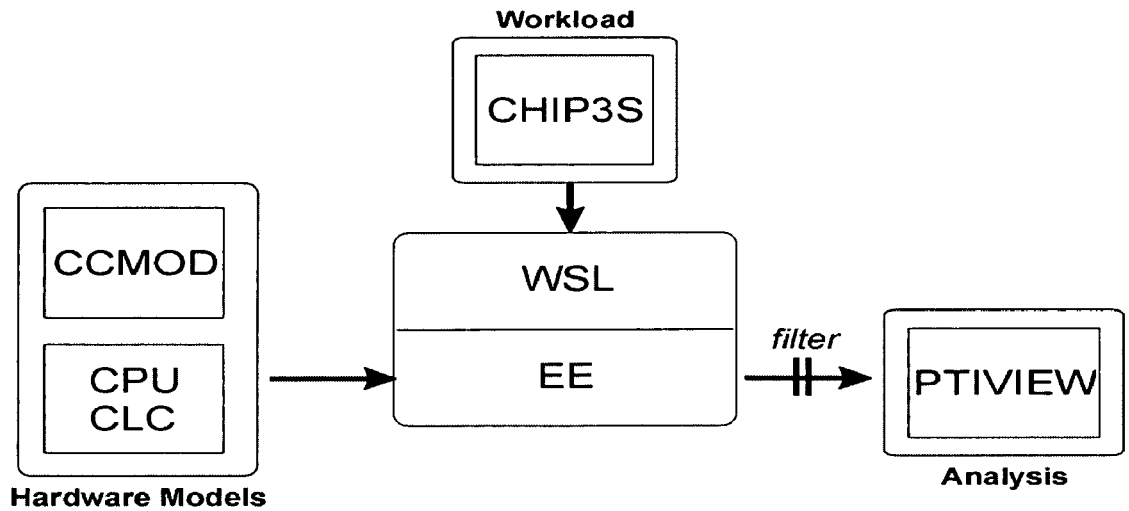
FIG. 11 is a schematic drawing depicting the primary functional components of a simple performance analysis utilizing separately designated workload and hardware models.

Having described an exemplary embodiment and variations thereof, attention is now directed to an implementation of the PTI for prototyping performance of MPI parallel applications. The exemplary implementation includes a known performance specification language, CHIP$^3$S, a hybrid communication model, communications contention model (CCMOD), a processor hardware model, and a Mathematica based performance output analysis toolset. This arrangement is summarized in FIG. 11.

The PTI implementation includes some of the basic features of the PTI architecture depicted in FIG. 2, including the XML inter-component schema and database processing for RUDs and OTs. The depicted architecture, in an enhanced version (not shown) supports dynamic hardware and model configuration. In the depicted embodiment, configurations are statically defined with regard to the hardware models 204 and evaluation engine 202. The WSL 200 and the evaluation 202 libraries support at least the basic services for defining workload and processing events.

The CHIP$^3$S performance specification language describes performance characteristics of software in the design and implementation stage. The software model includes known software execution graphs (SEGs) describing control flow and resource usage information for computations. Computations are defined at any of a limitless number of different levels of abstraction depending on the software development stage. In the early design stages the computation flow represents design prototypes at a high level of abstraction. During the implementation stages, when the source code is available, the computation description, if desired, models the source code in detail line by line. Communication interactions between processors using the MPI library are straightforward and will be known by those skilled in the art in view of the disclosure contained herein. A CHIP$^3$S compiler translates the performance scripts to C code including calls to the WSL 200. Transformation from CHIP$^3$S statements to WSL function calls is easy since there is a one-to-one correspondence between the CHIP$^3$S language and WSL constructs. CHIP$^3$S is part of the known PACE performance modeling and analysis environment and includes additional tools such as static performance analyzers. The application source code is automatically translated to CHIP$^3$S performance scripts.

The communications contention model (CCMOD) for the hardware model is a C++ library for providing performance (delay) predictions for communication networks. CCMOD models the underlying network topology using detailed workload information (traces), which encapsulates the expected computation/communication requirements of an application. The CCMOD is a hybrid model containing statistical model information as well as a simulation of the main stages that change the state of the communication network traffic. The CCMOD produces communication delay predictions considering the link contention and background loads. Integrating the CCMOD into PTI involves creating a hardware model interface that converts evaluation engine events into workload traces compatible with the expected CCMOD workload. Additionally, the output of CCMOD is integrated into the event duration field. Detailed output information showing network status during network model evaluation is embedded within a standard PTI output trace format with the introduction of new XML tags in the OT schema.

The CPU model, in an exemplary performance analysis is a simple C language operation cost analysis. The frequency of C operations is determined by the workload RUDs. A benchmark measures the cost of C operations on a specific system and combines workload RUDs to determine computational costs. The workload model in this particular example provides a simplistic representation of the CPU's performance since it does not consider memory hierarchy and sophisticated CPU operations (e.g. pipeling). However, in many instances it is sufficient to represent a hardware model that operates on single events.

Turning now to the output, a custom Mathematica performance analysis tool (PTIVIEW) creates visual representations summarizing the output traces generated by the PTI prototype. PTIVIEW processes both standard PTI and CCMOD traces to create the visual representation of system operation such as time-space diagrams. It also produces a number of overall performance metrics and comparisons of subsequent evaluations varying the workload or system configuration. Since Mathematica does not provide an XML processor the output traces are processed by a filter utility that converts the XML tags to a Mathematica compatible format.

Figure 12:
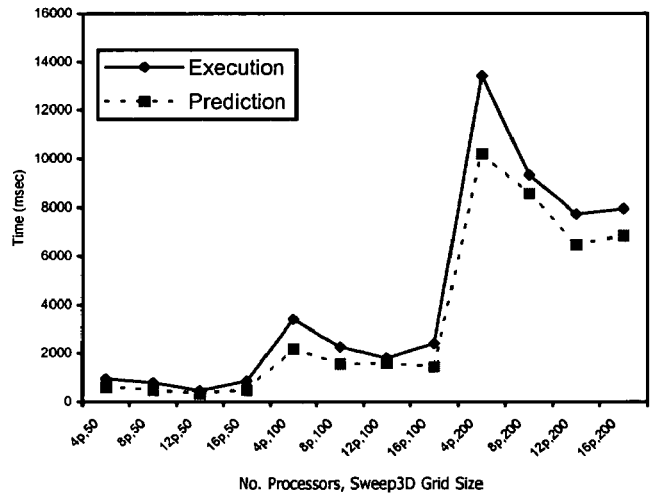
FIG. 12 is a graph comparing actual performance values to ones predicted by a performance analysis executed by the PTI example depicted in FIG. 11.

The results of the above described simple exemplary embodiment of a system incorporating the present invention are graphically depicted in FIG. 12. The exemplary system of FIG. 11, a prototype intended to implement the general concept of the present invention, was not expected to produce accurate or detailed performance predictions because a number of rough estimates/assumptions were utilized. As explained above system and model configuration are not dynamically defined through the HMC database. Instead, these components are statically included in the hardware models 204 and evaluation engine 202. A 16 PC cluster connected via a known Myrinet SAN switch was modeled. The Myrinet switch is a multistage ATM (Asynchronous Transfer Mode) network with peak bandwidth of 1.28 Gb/s and latency of 100 ns per 8-port switch. The CCMOD includes a hardware model description of the Myrinet switch, so no further adjustments are necessary. The PCs are 300 Mhz Pentium IIs with 384 Mb of RAM running Windows 2000.

A test workload was obtained for the known Sweep3D application that is part of the ASCI application suite. Sweep3D is a complex benchmark for evaluating wavefront application techniques for evaluating advanced parallel architectures at the Los Alamos Laboratories. The application uses the HPVM-MPI version 1.9 library from University of Illinois for inter-processor communication. The application source code was analyzed by the known PACE static performance analysis tools and produced a CHIP$^3$S script. The script can be configured for a range of problem sizes and processor configurations.

FIG. 12 graphically depicts a comparison of the predicted versus the measured execution time for various problem and system sizes. The error ranges from 5%, for smaller problem sizes, to 30% for larger configurations. The accuracy of the PTI modeled predictions is better than the individual hardware model accuracies. The CPU model tends to over predict computational delays because it does not model the memory hierarchy and processor internal parallelism. The communication hardware model tends to under-predict the communication delays because, in the present embodiment, it does not model message link pipelining and the MPI library overheads. Evaluating the model took place on a Pentium III 450 MHz running Windows 2000. The 16-processor configuration and the 200×200×200 Sweep3D array size generated 386233 events, and it took 3.437 seconds to evaluate without generating detailed output traces (112375 events/sec).

Many types of output formats can be used to summarize the information of the output traces. The above example provides a measure of average processing delays. Alternatively, detailed timelines can be generated for each processor, process, process thread, etc. in a modeled system. The PTI architecture supports an extensible output format selection. Other options include bandwidth utilization/availability graphs showing component utilizations, knee capacity graphs, etc. The PTI architecture can be extended to include third party hardware models, workload descriptions, and performance analysis tools. It provides an XML based interface between the architecture components and user extensions. The PTI architecture disclosed herein can be used as the underlying framework to develop models that support the software lifecycle. A number of performance tools have been scheduled to be developed based on PTI including a static performance analyzer as part of the compiler infrastructure. Support for the entire software lifecycle is possible because the PTI architecture supports flexible and/or dynamic definition of control flow and related resource usage information. In the initial stages of software development workload and/or hardware models can be of high level of abstraction aiming to provide initial insight to the performance of the application. In the latter stages of development, and after deployment, the models can be refined to represent in more detail the workloads. The workloads can be combined with a variety of hardware models based upon particular installations.

In all instances, the workload definition is not dependent upon a particular hardware model. Rather, the two separate components of a performance analysis are combined and processed by an evaluation engine. Existing workload specifications and hardware models are incorporated within PTI by the use of the API interface to the evaluation engine and the definition of XML schemas.

Illustrative embodiments of the present invention and certain variations thereof have been provided in the Figures and accompanying written description. The PTI architecture represents a powerful architecture from which a number of performance analytical tools and utilities will be developed for a wide variety of uses including: software programmers, system architects/administrators, dynamically configurable operating systems (load balancing and distribution), etc. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A computer implemented method for executing a computer system performance analysis model, the method comprising the steps of:

first providing a workload specification comprising a set of resource use requests including at least one event;

second providing at least one hardware model, independently defined with regard to the workload specification, comprising hardware performance information associated with a resource;

third providing a hardware configuration which defines the resource and including a reference to the resource defined by the hardware model, wherein providing a hardware configuration comprises creating the hardware configuration from an XML script independently designated with respect to the workload specification; and applying the hardware configuration to the workload specification to render performance data, wherein the applying step comprises referencing the hardware model to render performance information of the resource corresponding to the at least one event derived from the set of resource use requests.

2. The method of claim 1 further comprising the step of: providing an extensible schema defining a set of syntactic rules under which the script is formulated.

3. The method of claim 2 further comprising extending the set of syntactic rules according to definitions specified for the hardware model.

4. The method of claim 1 wherein the performance information of the resource comprises a modeled delay associated with an identified event.

5. The method of claim 4 wherein the identified event comprises a communication event.

6. The method of claim 1 further comprising rendering an output trace in a hardware-specific format, the rendering step comprising:

defining a standard output trace format;

extending the standard output trace format to support hardware-specific traces associated with the hardware model; and integrating standard output traces with hardware-specific traces to render an output trace in a hardware-specific format.

7. The method of claim 6 wherein output trace formats are specified by XML schemas.

8. The method of claim 1 further comprising the steps of: providing a set of user-specifiable instructions for controlling evaluation of a sub-set of a list of events associated with a workload specification.

9. The method of claim 1, wherein the computer system is a networked computer environment.

10. The method of claim 1, wherein the at least one event identifies a task of a modeled application and a hardware resource associated with performing the identified task.

11. A performance technology infrastructure facilitating integrating independently designated workload and hardware descriptions in a performance analysis, the performance technology infrastructure comprising:

at least one memory having stored therein:

a workload specification interface including a workload request output and a hardware system configuration output;

a hardware model interface including a resource request input based on at least a portion of a workload request, a hardware performance parameter input, and a performance data output;

a component configuration database associating the hardware system configuration with a hardware performance parameter, wherein the hardware system configuration of the component configuration database is specified in a form of a script comprising an XML script, and wherein the script is independently designated with respect to the workload specification; and an evaluation engine comprising an augmentable program structure including:

a set of slots for receiving a workload specification including the workload request output via the workload specification interface, and the hardware performance parameter from the component configuration database, wherein the performance data corresponding to devices specifiable within the hardware system configuration is retrieved from at least one hardware model via the hardware model interface; and at least one processor, coupled to the at least one memory, configured to execute the evaluation engine to perform the performance analysis.

12. The performance technology infrastructure of claim 11 further comprising an extensible configuration schema defining a set of syntactic rules under which the script is formulated.

13. The performance technology infrastructure of claim 12 further comprising a program architecture facilitating extending the set of syntactic rules according to definitions specified for the hardware model.

14. The performance technology infrastructure of claim 11 wherein the performance data comprises a modeled delay associated with an identified event of the resource request.

15. The performance technology infrastructure of claim 14 wherein the identified event comprises a communication event.

16. The performance technology infrastructure of claim 11 further comprising an output trace generator for rendering an output trace in a hardware-specific format, the generator comprising routines for facilitating performing the steps of:

defining a standard output trace format;

extending the standard output trace format to support hardware-specific traces associated with the hardware model; and integrating standard output traces with hardware-specific traces to render an output trace in a hardware-specific format.

17. The performance technology infrastructure of claim 16 wherein output trace formats are specified by XML schemas.

18. The performance technology infrastructure of claim 11 further comprising:

an evaluation control interface for receiving a set of user-specifiable instructions for controlling evaluation of a sub-set of a list of events associated with a workload specification.

19. A computer-readable storage medium having computer executable instructions for executing a computer system performance analysis model, the steps including:

first providing a workload specification comprising a set of resource use requests including at least one event;

second providing at least one hardware model, independently defined with regard to the workload specification, comprising hardware performance information associated with a resource;

third providing a hardware configuration which defines the resource and including a reference to the resource defined by the hardware model, wherein providing a hardware configuration comprises creating the hardware configuration from an XML script independently designated with respect to the workload specification; and applying the hardware configuration to the workload specification to render performance data, wherein the applying step comprises referencing the hardware model to render performance information of the resource corresponding to the at least one event derived from the set of resource use requests.

20. The computer-readable medium of claim 19 further comprising computer executable instructions for performing the step of:

providing an extensible schema defining a set of syntactic rules under which the script is formulated.

21. The computer-readable medium of claim 20 further comprising computer executable instructions for performing the step of:

extending the set of syntactic rules according to definitions specified for the hardware model.

22. The computer-readable medium of claim 19 wherein the performance information of the resource comprises a modeled delay associated with an identified event.

23. The computer-readable medium of claim 22 wherein the identified event comprises a communication event.

24. The computer-readable medium of claim 19 further comprising computer executable instructions for rendering an output trace in a hardware-specific format, the rendering step comprising:

defining a standard output trace format;

extending the standard output trace format to support hardware-specific traces associated with the hardware model; and integrating standard output traces with hardware-specific traces to render an output trace in a hardware specific format.

25. The computer-readable medium of claim 24 wherein output trace formats are specified by XML schemas.

26. The computer-readable medium of claim 19 further comprising computer executable instructions for supporting an evaluation control interface for receiving a set of user-specifiable instructions for controlling evaluation of a subset of a list of events associated with a workload specification.

27. A performance technology infrastructure facilitating integrating independently designated workload and hardware descriptions in a performance analysis, the performance technology infrastructure comprising:

at least one memory having stored therein:

a workload specification interface including a workload request out and a hardware system configuration output;

a hardware model interface including a resource request input, a hardware performance benchmark input, and a performance data output;

a component configuration database associating the hardware system configuration with the hardware performance benchmark, wherein the hardware system configuration of the component configuration database is specified in a form of a script comprising an XML script, and wherein the script is independently designated with respect to the workload specification; and an evaluation engine comprising an augmentable program structure including:

a set of slots for receiving a workload specification including the workload request output via the workload specification interface, and the configuration hardware performance benchmark from the component configuration database, wherein the performance data corresponding to devices specifiable within the hardware system configuration is retrieved from at least one hardware model via the hardware model interface; and at least one processor, coupled to the at least one memory, configured to execute the evaluation engine to perform the performance analysis.

* * * * *